United States Patent Office 3,331,581
Patented July 18, 1967

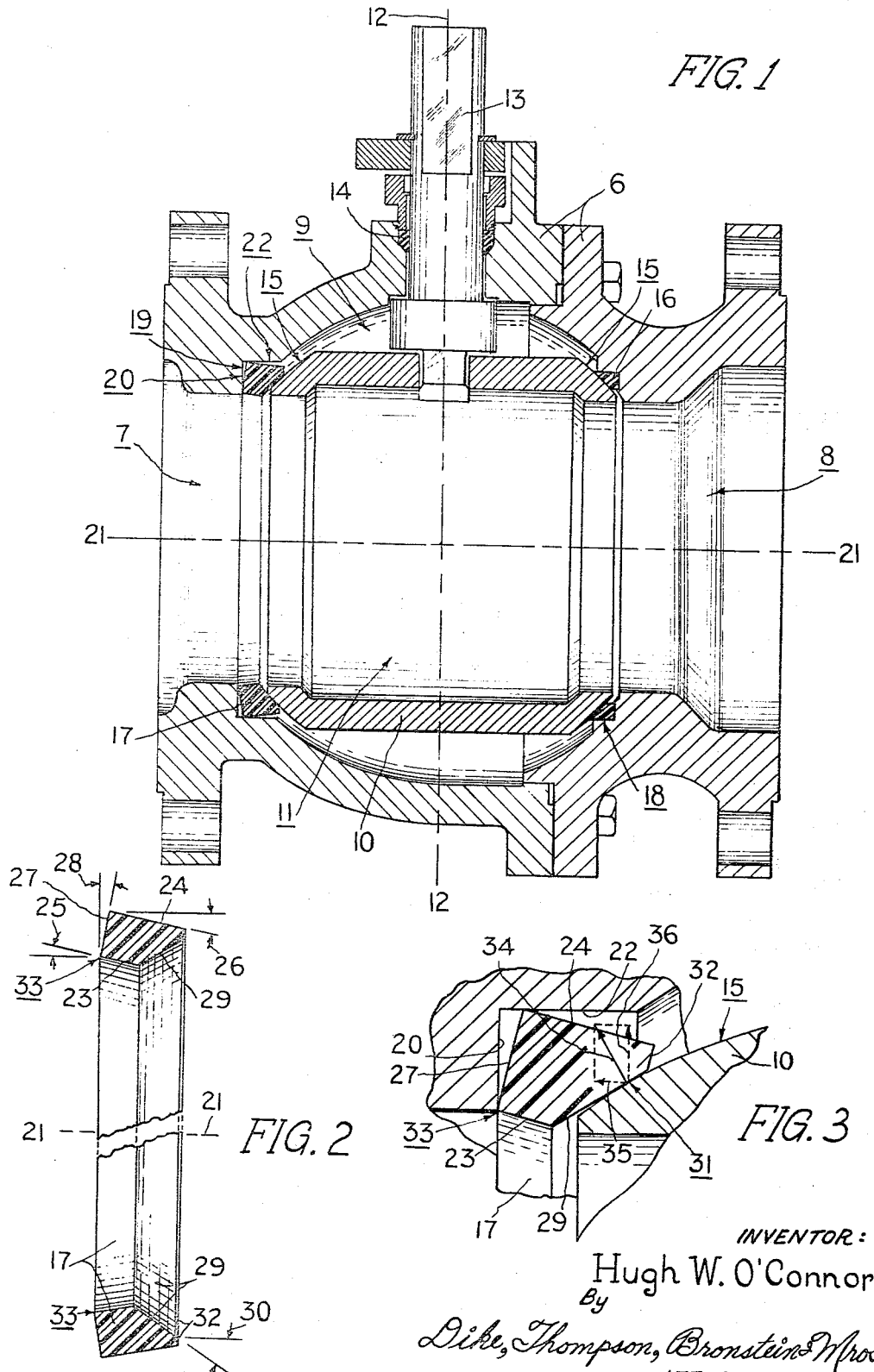

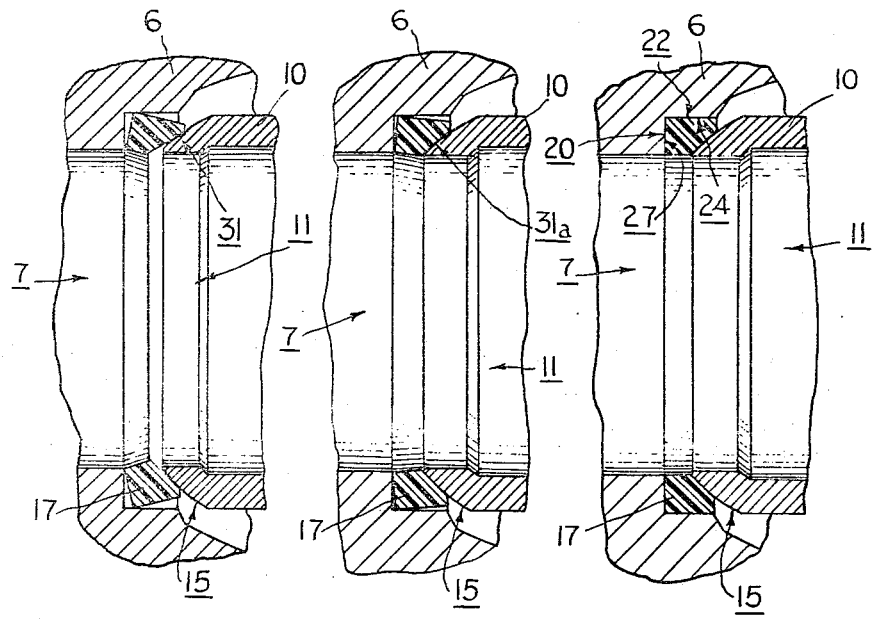
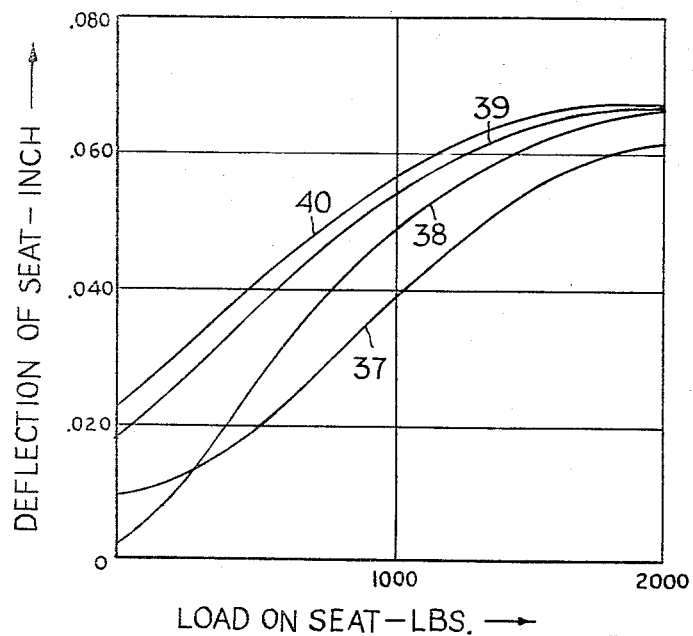

3,331,581
PLASTIC SPRING SEATS FOR BALL VALVES
Hugh W. O'Connor, Greensburg, Pa., assignor to Walworth Company, New York, N.Y., a corporation of New York
Filed Nov. 30, 1964, Ser. No. 414,678
3 Claims. (Cl. 251—315)

The present invention relates to improvements in the seating of ball-type valving members, an, in one particular aspect, to the provision of novel and improved ball valve constructions wherein low-cost relatively soft and flexible plastic seat rings cooperate with internal valve body surfaces to develop and maintain highly effective sealing under widely-varying load and temperature conditions without significant deformation.

So-called "ball" valves have long been well known instrumentalities for the control of fluid flow; in one common form they are characterized by a spherically-surfaced plug or valving member having a flow opening through it which may be brought into and out of communication with flow ports in a surrounding valve body as the member is angularly adjusted for these purposes via an actuating stem and handle connecting with the member at a single position. It is important that the angularly-movable valving element be well sealed in relation to the valve body, if leakage is to be suppressed, and yet the areas, friction coefficients, and pressures of frictional restraints imposed by the seat seals must be preserved at low levels to admit of ready adjustments by the operator. Accordingly, the development of this art has witnessed numerous proposals for designs of seat seals which will promote these objectives, including various ring-shaped seals which will be constantly biased into resilient seating engagement with the ball and which will permit the pressure-deflected ball to move somewhat without impairing tight sealing. In the interests of economy and simplicity, it is desirable that the seat rings themselves provide the needed resilience, rather than being separately backed by springs, and this has led to such shaping of seals as will cause them to function as spring washers, often with highly intricate surface configurations needed to produce good sealing with the spherically-surfaced plug and the interior of the valve body. The present teachings are likewise concerned with seat seals which require no resilient backing or reinforcement, but which at the same time are unique and most advantageous in that they are of remarkably simple and regular configuration, lend themselves to manufacture with relatively soft materials having low coefficients of friction, and, in cooperation with specially-formed body surfaces of simple configuration, are protected against deformation and develop a highly desirable gradually-increasing spring rate.

It is one of the objects of the present invention, therefore, to provide novel and improved spring-seat sealing for ball valves exploiting plastic seat rings which are of unique compact cross-sections promoting biasing essentially through torsional twisting and avoiding undesirable bending and high localized stressing.

A further object is to provide unique non-corroding plastic torsion-spring ball valve seats of economical construction which develop relatively soft and stiff spring characteristics under different loading conditions and which avoid permanent deformations under maximum loading and high-temperature conditions.

Another object is to provide simple low-cost seat rings for large-size ball valves wherein desired spring-biasing effects are achieved by torsional twisting without bending and wherein low spring rates produced under light loading conditions make it possible the fabrication of large-size valves using parts manufactured with relatively low tolerances.

A yet further object is to provide ball valve springseat rings of relatively soft plastic exhibiting low coefficients of friction and having readily-made substantially flat surfaces which are so related as to promote essentially pure torsional twisting without high localized stressing, bending, or permanent deformation.

In addition, it is an object to provide improved ball valve seat rings of relatively soft plastic proportioned to react to loading forces with essentially pure torsional twisting and changes in diameter and to remain free of deleterious bending.

Still further it is an object to provide non-bending softplastic ball valve seats which cooperate with fully open body seating surfaces to absorb high loading without permanent deformation and to exhibit relatively low spring rates under light-load conditions.

By way of a summary account of practice of this invention in one of its aspects, a generally-conventional metal ball valve assembly having a body in enclosing relation to a spherically-surfaced rotatable plug with a flow passageway therethrough includes at least one resilient seat ring disposed in a concentrically-surrounding relation to one of the body flow ports and in a position where it may engage the spherical surfaces of the plug to provide a fluid-tight seal between the inner body surfaces and the plug. The seat seal preferably comprises a solid ring of relatively soft plastic having a relatively low coefficient of friction, such as a tetrafluoroethylene polymer, the substantially trapezoidal cross-section of which is defined by substantially flat sides. When the ring is in an unloaded relaxed state, its inner and outer peripheral surfaces are substantially parallel and inclined conically toward the center of the plug member, with an inner side face engaging the spherically-surfaced plug member likewise being conical, although inclined away from the center of the ball and engaging it only near its radially outer portion. The opposite or outer side face of the ring forms two circular lines of juncture with the inner and outer peripheries, the former being engaged with a cooperating body seating surface for the ring and the latter being in no more than light engagement with another body seating surface for the ring. Both body seating surfaces merge to form a ring-seating recess of substantially triangular cross-section having essentially the same angle as the angle formed between the outer periphery and outer side face of the ring, whereby torsional twisting of the ring under high loading conditions causes both the outer periphery and outer side face to abut and become fully backed by the body ring-seating surfaces.

Although the aspects and features of this invention which are believed to be novel are expressed in the appended claims, additional details as to preferred practices and embodiments, and as to the further advantages, objects and features thereof, may be most readily comprehended through reference to the following description taken in connection with the accompanying drawings, wherein:

FIGURE 1 is a cross-section of a ball valve assembly embodying teachings of the present invention;

FIGURE 2 illustrates an improved torsionally-resilient seat ring for ball valves, in cross-section;

FIGURE 3 depicts cross-sectioned fragments of a cooperating valve body, seat ring, and spherical plug, such as those of the assembly of FIGURE 1;

FIGURES 4a, 4b and 4c represent cross-sectioned fragments of a valve body and spherical plug in association with a unique plastic seat ring, under light, medium and heavy loading conditions, respectively, and FIGURE 5 graphically portrays deflection vs. load characteristics of the improved seat ring during a series of loading cycles.

The assembly appearing in FIGURE 1 includes a two-part flanged valve body 6 having aligned flow parts 7 and 8 communicating with opposite extremities of an enlarged body cavity 9 wherein a plug member 10 is situated. Member 10 is provided with a flow passageway 11 therethrough which may be brought into alignment with both body ports to render the valve fully open (the illustrated condition), and which may be turned 90 degrees about the axis 12—12, by a handle or other actuator (not shown) fixed with the short stem 13, to block fluid flow between the ports. A shaped inner end of the stem 13 mates somewhat loosely with a shaped recess in member 10 to permit application of turning torques to the plug member, and a compressible packing 14 seals the rotatable stem and body. Spherically-shaped exterior surfaces 15 on member 10 are engaged with and entrapped by two plastic seat rings, 16 and 17, disposed in body recesses 18 and 19, respectively, encircling the inner ends of ports 8 and 9. Both rings serve as low-friction seats and seals for the ball, which would otherwise be free to move by appreciable amounts within the cavity 9; however, seat ring 16 is essentially fixed and passive, while seat ring 17 is a dynamic element which functions as a resilient seat-seal having relatively soft and stiff spring characteristics under different loading conditions. In this preferred embodiment, the body recess 19 for spring-seat ring 17 is of a frusto-conical configuration which is particularly simple to machine; there are two merging surfaces for this recess, one of which, 20, is annular and substantially planar in direction normal to the axis 21—21 of the ports, and the other of which, 22, is cylindrical and concentric with the port 7 about axis 21—21. The enlarged detail in FIGURE 3 shows that these surfaces are substantially perpendicular to one another, in cross-section; this is a preferred relationship although advantage may also be realized with somewhat different recess configurations in cooperation with appropriately-shaped seat rings.

As is best illustrated in FIGURES 2 and 3, the spring-seat ring 17 is a single-piece solid integral plastic element which, in the relaxed as-manufactured state (i.e. unloaded), has a generally truncated frusto-conical configuration, and a cross-section which is essentially trapezoidal. Its concentric conical inner and outer peripheries, 23 and 24, respectively, are inclined by like angles 25 and 26 toward central axis 21—21 in the forward direction toward the plug member. Rear face 27, extending between surfaces 23 and 24, is likewise somewhat conical, being sloped forward from the inner periphery to the outer by a shallow angle 28. Preferably the rear surface 26 is normal to both the inner and outer peripheries, as viewed in cross-section. At the front, where it engages the spherically-shaped surfaces of a ball-type plug member, the ring exhibits a conically-sloped face 29, having a forward slope angle 30 from the inner to outer peripheries which, in relation to the spherical curvature and size of plug member 10, causes this surface to engage the plug member at a point 31 (FIGURE 3) nearer the front and radially outermore part of the front face of the lightly-loaded ring. The front face may terminate in a blunt outer rim 32, as shown, to avoid the involvement of a thin sharp edge at that site; the shaping of the rim is not otherwise critical and may be somewhat rounded, for example. All of the conically-sloped surfaces are readily formed, as by machining, and involve no intricate configurations.

The plastic of which the ring 17 is made is preferably a tetrafluoroethylene polymer, which has a low coefficient of friction, resists most corrosives, and withstands high temperatures, but, on the other hand, is relatively soft and susceptible to permanent deformation under high loads. The latter factors militates against the use of ring designs in which bending characteristics are relied upon to develop the needed resilience in seating of the ball member. However, ring 17 functions in a different manner under high loading, by exhibiting torsional twisting and, to some extent, circumferential stretching, which advantageously involve the ring as a whole and thereby avoid high localized stressing. The desired resilience due to torsional twisting is promoted by the ring shaping which causes the rear inner edge 33 to project furthest rearwardly and to engage and pivot upon the rear recess surface 20 as the front face is pressed rearwardly and upwardly by the plug. In FIGURE 3, the force 34 exerted by plug 10 at circumferentially-distributed points 31, which are radially outermore than edge 33, is seen to be resolved into two components, 35 and 36, which act rearwardly and radially outwardly, to promote the aforesaid torsional twisting and stretching. The ring is sufficiently thick and stiff otherwise to preclude substantial bending. Negligible bending occurs when the ratio of the outer to inner ring diameters is less than about 1.5 (typically about 1.2) and when the width of the ring in the axial direction is at least about the same as its thickness in the radial direction (typically about 2); these parameters insure that the ring will not behave in the manner of a Belleville spring, wherein very high stresses may arise in the inner corners as the result of rather small deflections.

Forces acting upon the seat ring form a moment tending to twist it torsionally around a circumferential line, with the angle of twist being directly proportional to the twisting moment, provided the maximum stresses in the plastic do not exceed its elastic limit. As the seat ring twists, the point of contact 31 between the ball member and front face of the ring moves radially inwardly toward axis 21—21 by a distinct amount, and the region of application of resultant force 35 on the rear surface 20 of the seat recess moves radially outwardly, by an amount depending upon the localized deformation of the back face 27 at the site of contact with that surface. The net effect of these actions, including the tendency of the ring to increase in diameter, is that the increments of angular twist of the seat ring are disproportionately less with increasing increments of loading, that is, the ring behaves as a relatively soft spring as deflections commence and then becomes stiffer as the deflections increase further. A highly favorable aspect of this characteristic is found in the fact that, as different valves are assembled, their dimensional variations may cause different initial deflections of their seat rings, yet these small differences involve only small changes in seat ring spring forces, such that all of the valves will have about the same operating torques. This is particularly advantageous in the construction of large-size ball valves, where it is not as practical to attempt to hold accumulated tolerances to within very small ranges. FIGURES 4a and 4b represent the light-and medium-load conditions wherein the locus of contact 31 (FIGURE 4a) between the ball and seat is noted to move radially inwardly, to a locus 31a (FIGURE 4b) as the loading increases and the ball moves toward and presses harder against the seat ring. Under a maximum loading condition, such as that illustrated in FIGURE 4c, the rear face 27 of ring 17 fully engages the back surface 20 of the seat recess, and, moreover, the outer peripheral surface 24 of the ring fully engages the outer surface 22 of the recess, and the seat ring is thus fully supported against deformations. No additional torsional twisting or circumferential stretching of the ring material is then possible, and the relatively soft flexible plastic is well protected against permanent deformation and loss of needed spring characteristics. The fact that the recess configuration is an accurate counterpart of that formed by the rear face and outer periphery of the seat ring helps assure that no flow and permanent deformation of the plastic will occur during extreme loading.

In the graph of FIGURE 5, the ordinate represents typical axial seat deflections, in inches, which are experienced with a seat ring such as that of FIGURE 2 undergoing successive exposures to variable loading over a range up to 2000 pounds (abscissa) applied through a 10-inch ball valve plug member. The seat ring unit employed in these tests possessed an axial length of about 1.33 inches, a maximum outer diametric dimension of 9.25 inches, and a maximum inner diametric dimension of 8.0 inches, with about a 5° angle at the sites corresponding to angles 24, 25 and 28 (FIGURE 2), and an angle of about 35° for the front face angle 30. Curves 37, 38 and 39 characterized the first three cycles of loading, and curve 40 characterized the stabilized spring effect which was quickly realized in the fourth through sixth cycles of loading. Relatively soft (high slope) spring characteristics are evidenced at the lower loadings, with the ring functioning as a subtantially stiff and unyielding element under the highest-load conditions.

It will be appreciated by those skilled in the art that the present teachings may also be exploited in connection with more than one seat for a ball valve, that the valve constructions wherein the improved spring-seats are used may vary in many respects from that chosen for illustration and discussion in this specification, and that alternative constructions of the improved seat ring and seat may involve specific differences from the forms illustrated while yet expressing the same invention. Therefore, it should be understood that the embodiments and practices described and portrayed have been presented by way of disclosure, rather than limitation, and that various modifications, substitutions and combinations may be effected without departure from the spirit and scope of this invention in its broader aspects.

What I claim as new and desire to secure by Letters Patent of the United States is:

1. A ball valve comprising, a valve body having a fluid flow passageway therethrough, a spherically-surfaced valving member having a fluid flow passageway therethrough and rotatable within said body between flow-control positions wherein said passageways are aligned and are out of alignment, said body having at least one annular valve seat recess therein surrounding the flow passageway therein and opening in proximity with spherical surfaces of said valving member, said seat recess being formed by surfaces extending substantially radially outwardly from said body flow passageway and extending substantially axially toward said valving member, and an annular plastic seat seal ring disposed in said seat recess and in engagement with spherical surfaces of said valving member, said annular seat seal ring comprising a substantially truncated conical member the outer periphery of which slopes inwardly in direction toward said valving member and the front face of which is in engagement with said valving member surface is of substantially truncated conical form and slopes inwardly in direction away from said valving member, said front face being sloped in relation to the spherical surfaces of said valving member to contact said surfaces radially near the outer periphery of the ring under light-load conditions, the rear face and outer periphery of said ring forming substantially the same configuration as said substantially radially and axially extending surfaces, respectively, of said recess and normally being spaced from said recess surfaces except at positions radially near said body passageway and axially displaced from said valving member, respectively, whereby increases in loading between said valving member and seat seal ring cause said front face of said ring to contact said valving member surfaces radially nearer the inner periphery of said ring and cause torsional twisting and diametric expansion of said ring until said rear face and outer periphery of said ring are in full engagement with said substantially radially and axially extending surfaces of said recess.

2. A ball valve as set forth in claim 1, wherein said seat seal ring is a solid member of a tetrafluoroethylene polymer material, and wherein said ring has a cross-section which is substantially trapezoidal at each angular position thereof formed by substantially truncated conical surfaces.

3. A ball valve as set forth in claim 1, wherein said seat seal ring is a solid member formed of a relatively soft plastic exhibiting a low coefficient of friction with said spherical surfaces of said valving member, wherein the ratio of maximum outside to inside diameters of said ring is less than about 1.5, and wherein the axial length of said ring is at least about equal to the radial thickness of said ring, whereby undesirable bending and high localized stressing in said plastic ring are minimized.

References Cited

UNITED STATES PATENTS

| | | | |
|---|---|---|---|
| 2,297,161 | 9/1942 | Newton. | |
| 2,989,990 | 6/1961 | Bass | 251—172 X |
| 3,067,978 | 12/1962 | Natho | 251—172 |
| 3,096,965 | 7/1963 | Margus | 251—315 X |
| 3,146,988 | 9/1964 | Riopelle | 251—315 |

FOREIGN PATENTS

| | | |
|---|---|---|
| 862,188 | 3/1961 | Great Britain. |

WILLIAM F. O'DEA, *Primary Examiner.*

HAROLD WEAKLEY, *Examiner.*